United States Patent
Ito

(10) Patent No.: US 10,313,562 B2
(45) Date of Patent: Jun. 4, 2019

(54) GENERATING CORRECTION TABLE FOR PRINTING INCLUDES GENERATING MULTI-DIMENSIONAL CONVERSION TABLE DETERMINING CORRESPONDANCE BETWEEN DIFFERENT APPARATUS DEPENDENT COLOR VALUES

(71) Applicant: SEIKO EPSON CORPORATION, Tokyo (JP)

(72) Inventor: Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/817,685

(22) Filed: Nov. 20, 2017

(65) Prior Publication Data

US 2018/0160015 A1    Jun. 7, 2018

(30) Foreign Application Priority Data

Dec. 2, 2016    (JP) ................................. 2016-234990

(51) Int. Cl.
     *H04N 1/60*            (2006.01)
     *G06K 15/02*          (2006.01)

(52) U.S. Cl.
     CPC ....... *H04N 1/6019* (2013.01); *G06K 15/1878* (2013.01); *H04N 1/605* (2013.01);
     (Continued)

(58) Field of Classification Search
     CPC ...... H04N 1/60; H04N 1/6002; H04N 1/6005; H04N 1/6008; H04N 1/6016; H04N 1/6019; H04N 1/6058; G06K 15/1878
     See application file for complete search history.

(56) References Cited

U.S. PATENT DOCUMENTS 5,398,121 A * 3/1995 Kowalewski ........ H04N 1/6019
                                                                    358/504
7,595,921 B2 * 9/2009 Ito ........................ H04N 1/6019
                                                                    358/1.9

(Continued)

FOREIGN PATENT DOCUMENTS

JP      2011-223345 A     11/2011
JP      2013-509059 A      3/2013

(Continued)

OTHER PUBLICATIONS

The Extended European Search Report for the corresponding European Patent Application No. 17204681.5 dated Apr. 13, 2018.

*Primary Examiner* — Scott A Rogers

(57) ABSTRACT

A correction table generation method includes acquiring a first color value of an apparatus non-dependent color system corresponding to an input value of a multi-dimensional apparatus dependent color system in an input lattice point of the color conversion table and generating a multi-dimensional conversion table in which a first apparatus dependent value of the apparatus dependent color system having color conversion table color value characteristics is correlated with a second apparatus dependent value having a color value of the apparatus non-dependent color system and approximate linearity over multiple dimensions, and the generating of the multi-dimensional conversion table includes determining a target color value for multiple dimensions having approximate linearity over the multiple dimensions with respect to the input value, and determining a first apparatus dependent value corresponding to a second apparatus dependent value using the input value, the target color value for the multiple dimensions, and the first color value.

8 Claims, 13 Drawing Sheets

(52) U.S. Cl.
CPC ......... *H04N 1/6005* (2013.01); *H04N 1/6008* (2013.01); *H04N 1/6058* (2013.01); *H04N 2201/0082* (2013.01)

(56) References Cited

U.S. PATENT DOCUMENTS

| | | |
|---|---|---|
| 2005/0270600 A1 | 12/2005 | Ito et al. |
| 2006/0250624 A1 | 11/2006 | Spaulding et al. |
| 2012/0257227 A1 | 10/2012 | Wurster et al. |

FOREIGN PATENT DOCUMENTS

| | | |
|---|---|---|
| JP | 2017-118234 A | 6/2017 |
| JP | 2017-183765 A | 10/2017 |
| WO | 03040933 A2 | 5/2003 |

\* cited by examiner

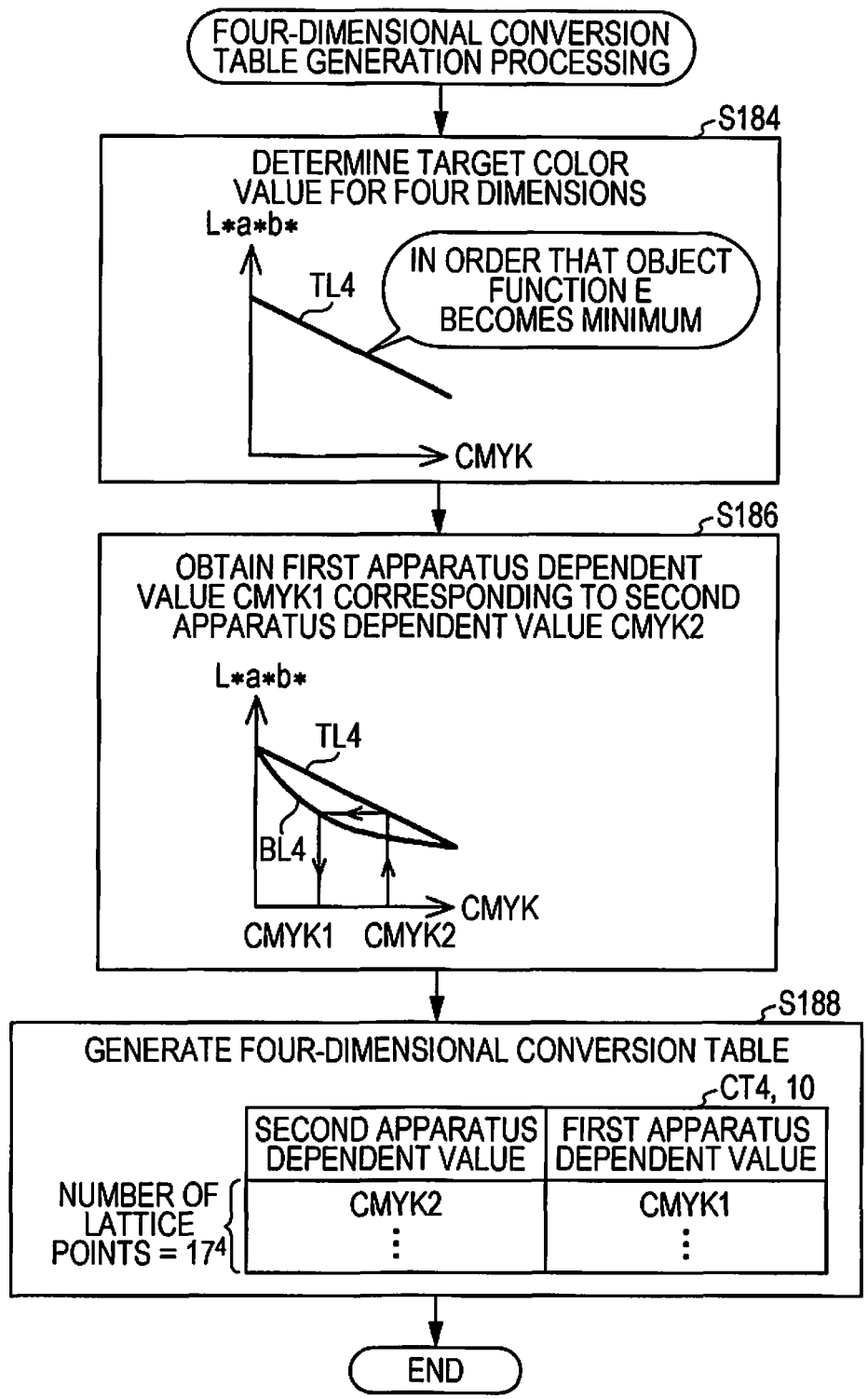

GENERATING CORRECTION TABLE FOR PRINTING INCLUDES GENERATING MULTI-DIMENSIONAL CONVERSION TABLE DETERMINING CORRESPONDANCE BETWEEN DIFFERENT APPARATUS DEPENDENT COLOR VALUES

BACKGROUND

1. Technical Field

The technology disclosed in the present specification relates to a technology relating to a printer, particularly to a correction table generation method of a color conversion table.

2. Related Art

In the related art, linearization of input and output characteristics of a printer is discussed (for example, see JP-T-2013-509059). In the technology described in JP-T-2013-509059, in a case where color mixture specified by a combination of values of a multi-dimensional apparatus dependent color system is linearized, linearization is performed in a target dimension by fixing a value for a dimension other than a linearization target dimension, the same linearization is performed using an obtained value while changing the linearization target dimension to perform linearization for all dimensions.

According to the technology described in JP-T-2013-509059, linearization is repeated for respective dimensions to implement linearization for color mixture. However, there is possibility that finally obtained linearization characteristics are not evenly contributed to each dimension direction and linearization over multiple dimensions cannot be implemented.

In the present specification, a technology for linearizing the input and output characteristics of the printer over all dimensions of a multi-dimensional color system is disclosed.

SUMMARY

The technology disclosed in the present specification can be realized in the following aspects.

(1) According to an aspect of the invention, there is provided a correction table generation method of generating a correction table for correcting an input value of a predetermined color conversion table in order to determine an ink amount to be ejected by a printer. The correction table generation method includes acquiring a first color value of an apparatus non-dependent color system corresponding to an input value of a multi-dimensional apparatus dependent color system in an input lattice point of the color conversion table by color measurement, and generating a multi-dimensional conversion table in which a first apparatus dependent value of the apparatus dependent color system having color conversion table color value characteristics which are characteristics of the first color value with respect to the input value is correlated with a second apparatus dependent value of the apparatus dependent color system having approximate linearity with respect to a color value of the apparatus non-dependent color system over multiple dimensions, in which the generating of multi-dimensional conversion table includes determining a target color value for multiple dimensions having approximate linearity with respect to the input value over the multiple dimensions, so that an object function is minimized by defining a cubic spline function, in which a value of the apparatus dependent color system is set as an independent variable and a color value of the apparatus non-dependent color system is set as a dependent variable, for each one dimension of the multiple dimensions and generating the object function using the cubic spline function corresponding to all dimensions, and determining the first apparatus dependent value corresponding to the second apparatus dependent value by interpolation using the input value, the target color value for the multiple dimensions, and the first color value.

In the correction table generation method according to the aspect, it is possible to generate a correction table provided with a multi-dimensional conversion table in which the second apparatus dependent value is correlated with the first apparatus dependent value. The second apparatus dependent value has approximate linearity over multiple dimensions with respect to a value (color value) of the apparatus non-dependent color system. For that reason, when the correction table generated by the correction table generation method of the aspect is applied to a printer provided with the color conversion table used in the method, input and output characteristics are linearized and printed matter having the linearized color value can be obtained for a value of a color system of a previous printer converted by the correction table.

(2) The correction table generation method according to the aspect may further include generating a one-dimensional conversion table in which a third apparatus dependent value of the apparatus dependent color system having approximate linearity with respect to the color value of the apparatus non-dependent color system in one dimension is correlated with the first apparatus dependent value for all dimensions, in which the generating of the multi-dimensional conversion table includes obtaining the second apparatus dependent value using inverse one-dimensional conversion of the one-dimensional conversion table, and the target color value for the multiple dimensions may be determined by substituting the second apparatus dependent value obtained in the inverse one-dimensional conversion into the independent variable in the determining of the target color value for the multiple dimensions. By doing as such, a conversion error due to the multi-dimensional conversion table is suppressed.

(3) The correction table generation method according the aspect may further include generating a one-dimensional conversion table in which the third apparatus dependent value of the apparatus dependent color system having approximate linearity with respect to the color value of the apparatus non-dependent color system in one dimension is correlated with the first apparatus dependent value for all dimensions, and correcting the first apparatus dependent value of the multi-dimensional conversion table by performing inverse one-dimensional conversion which is inverse conversion of the one-dimensional conversion table and multi-dimensional conversion using the multi-dimensional conversion table. Also, by doing as described above, a conversion error due to the multi-dimensional conversion table is suppressed.

(4) In the correction table generation method according to the aspect, the object function may be a total sum, in all of the multiple dimensions, of a square sum of a second-order differential parameter of the cubic spline function in each dimension. By doing as such, it is possible to obtain an optimized target color value for multiple dimensions.

(5) In the correction table generation method according to the aspect, the object function may be a total sum of all combinations in all of the multiple dimensions, of a square sum of a difference between a first second-order differential parameter and a second second-order differential parameter, which are the second-order differential parameters of each of a first cubic spline function and a second cubic spline function which are the cubic spline functions in a first dimension and adjacent to each other in a direction of a second dimension different from the first dimension. Also, by doing as described above, it is possible to obtain an optimized target color value for multiple dimensions.

(6) In the correction table generation method according to the aspect, the first apparatus dependent value may be determined so that a difference between the second apparatus dependent value and the first apparatus dependent value becomes minimum, in the determining of the first apparatus dependent value. By doing as such, it is possible to reduce change in a value of an apparatus dependent color system accompanied by multi-dimensional conversion. As a result, in a case where a correction table generated by the method is applied to a printer, it is possible to suppress excessive replacement of an inappropriate apparatus dependent value in the printed matter.

(7) In the correction table generation method according to the aspect, in the determining of the target color value for multiple dimensions, in a case where it is intended to determine the target color value for multiple dimensions corresponding to an achromatic color input value that specifies an achromatic color among the plurality of input values, lightness may be determined so that the object function becomes minimum and corresponding chromaticity may be determined to have linearity with respect to determined lightness to thereby determine the target color value for multiple dimensions and in a case where it is intended to determine the target color value for multiple dimensions corresponding to remaining input values, lightness and chromaticity constituting the target color value for multiple dimensions may be determined so that the object function become minimum. By doing as such, the target color value for multiple dimensions corresponding to the achromatic color input value is neutralized (achromatization in which hue cannot be visually felt). Lightness is determined by the same method (minimization of object function) as that for the input value other than the achromatic color input value and thus, it is possible to secure continuity of color values corresponding to each of the achromatic color input value and a surrounding input value thereof and obtain natural lightness characteristics.

The technology disclosed in the present specification can be implemented in various forms other than the correction table generation method. It is possible to implement in various forms, for example, a correction table generation program various devices conducting a correction table generation method, a system including the various devices, a computer program for implementing a control method of the various devices and the system, a non-transitory storage medium having stored the computer program.

BRIEF DESCRIPTION OF THE DRAWINGS

The invention will be described with reference to the accompanying drawings, wherein like numbers reference like elements.

FIG. 4 is a flowchart illustrating a flow of four-dimensional conversion table generation processing.

DESCRIPTION OF EXEMPLARY EMBODIMENTS

A. First Embodiment

Prior to description of a correction table generation method of a first embodiment, an outline of a correction table will be described based on FIG. 1 by exemplifying a printer to which the correction table is applied.

Figure 1:
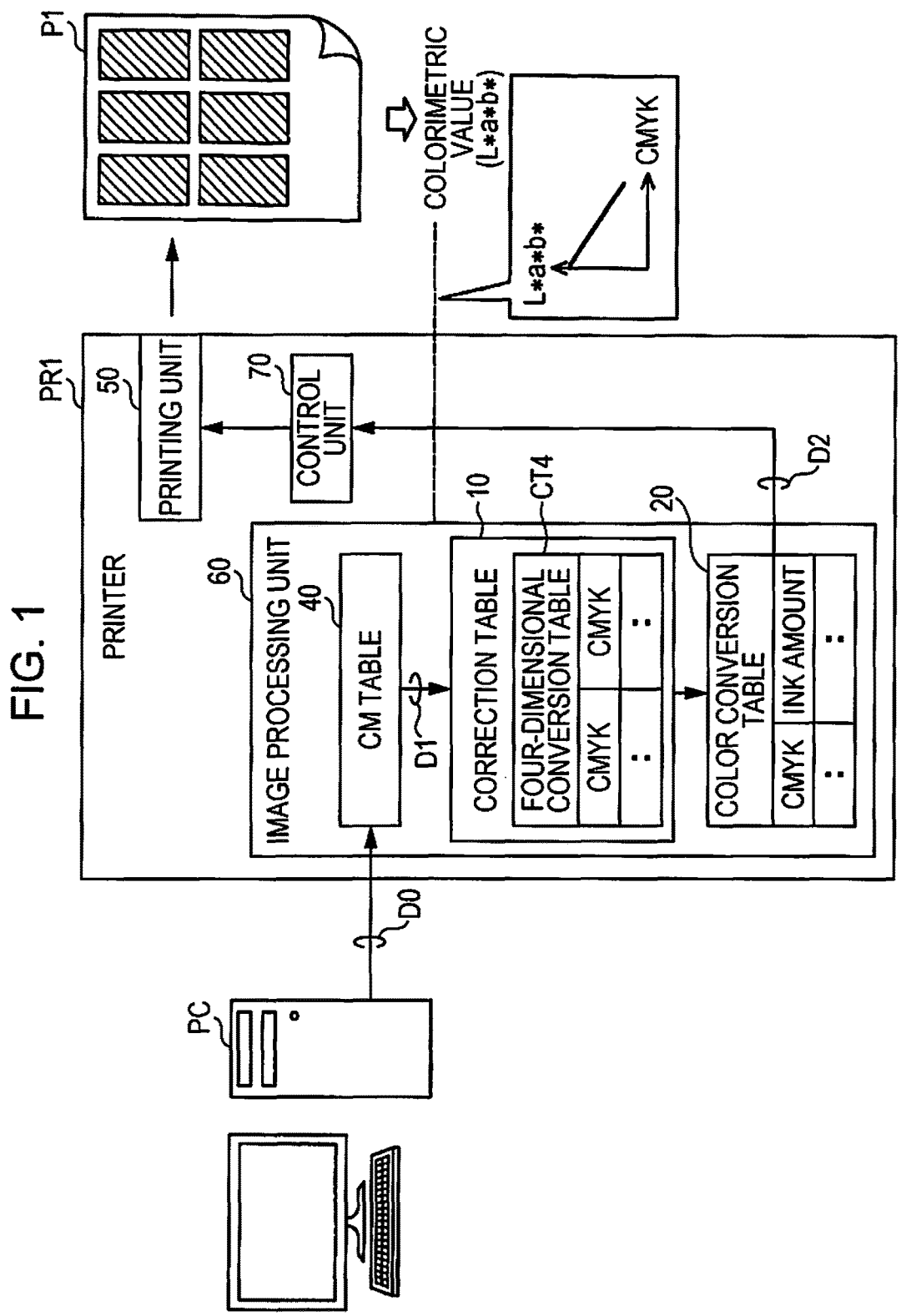
FIG. 1 is an explanatory diagram for explaining an outline of a correction table generated by a correction table generation method of a first embodiment.

FIG. 1 is an explanatory diagram for explaining an outline of a correction table 10 generated by a correction table generation method of a first embodiment. In FIG. 1, a printer PR1 to which the correction table 10 is applied is conceptually illustrated.

The printer PR1 includes a printing unit 50, an image processing unit 60, and a control unit 70. The printing unit 50 includes a plurality of ink head units (not illustrated) and an ink cartridge is installed at each ink head unit to supply ink to the head unit. The printer PR1 is configured to be able to utilize four kinds of ink of cyan (C), magenta (M), yellow (Y), and black (K).

The image processing unit 60 includes a color matching table 40 (in the following, referred to as CM table 40), a correction table 10, and a color conversion table 20. The CM table 40 is a table formed by a combination of a source profile and a media profile and is a table for converting image data (source data) input to the printer PR1 into image data, which corresponds to a color system (apparatus dependent color system) of the printer PR1, according to a kind of media. In the present embodiment, a CMYK color system is exemplified as an apparatus dependent color system. In the following, a coordinate value of the CMYK color system may also be referred to as a CMYK value or CMYK data.

Specifically, image data is described by a combination of respective values (0 to 255) of C (cyan), Y (yellow), M (magenta), and K (black). The color conversion table 20 is a table in which the CMYK value is set as an input and an ink amount is set as an output. The correction table 10 is a table generated by the correction table generation method of the first embodiment and is a table used for linearizing input and output characteristics of the printer PR1 by correcting an input value of the color conversion table 20.

The control unit 70 is configured by a microcomputer including a central processing unit (CPU) and a memory (main storage device) and is able to control respective constitutional units of the printer PR1. The printer PR1 includes an external interface unit, an operation panel, a media transportation unit, and the like, but illustration thereof is omitted in FIG. 1.

Description will be made on a flow of image data in the printer PR1. As illustrated by a solid line in the figure, when image data D0 prepared by a computer PC is input to the image processing unit 60 of the printer PR1, image data D0 is converted into CMYK data D1 according to the media by the CM table 40, and CMYK data D1 is converted into ink amount data D2 by the correction table 10 and the color conversion table 20. The control unit 70 controls forming of a print image in the printing unit 50 based on ink amount data D2. As a result, printed matter P1 is prepared. Here, input and output characteristics of the printer PR1 is determined by the correction table 10 and the color conversion table 20 except for conversion of the CM table 40.

When the printed matter P1 printed by the printer PR1 is subjected to colorimetry by a colorimeter, a color value (for example, a color value of CIE-LAB color system) which is a colorimetry result has linearity with respect to CMYK data D1. That is, the input and output characteristics of the printer PR1 is linearized. In FIG. 1, an example in which color patch data as image data D0 is input to the printer PR1 is illustrated. In the following, the color value of the CIE-LAB color system is also referred to as simply an "L*a*b* value" or an "Lab value".

The correction table generation device that generates the correction table 10 described above will be described in the following.

Figure 2:
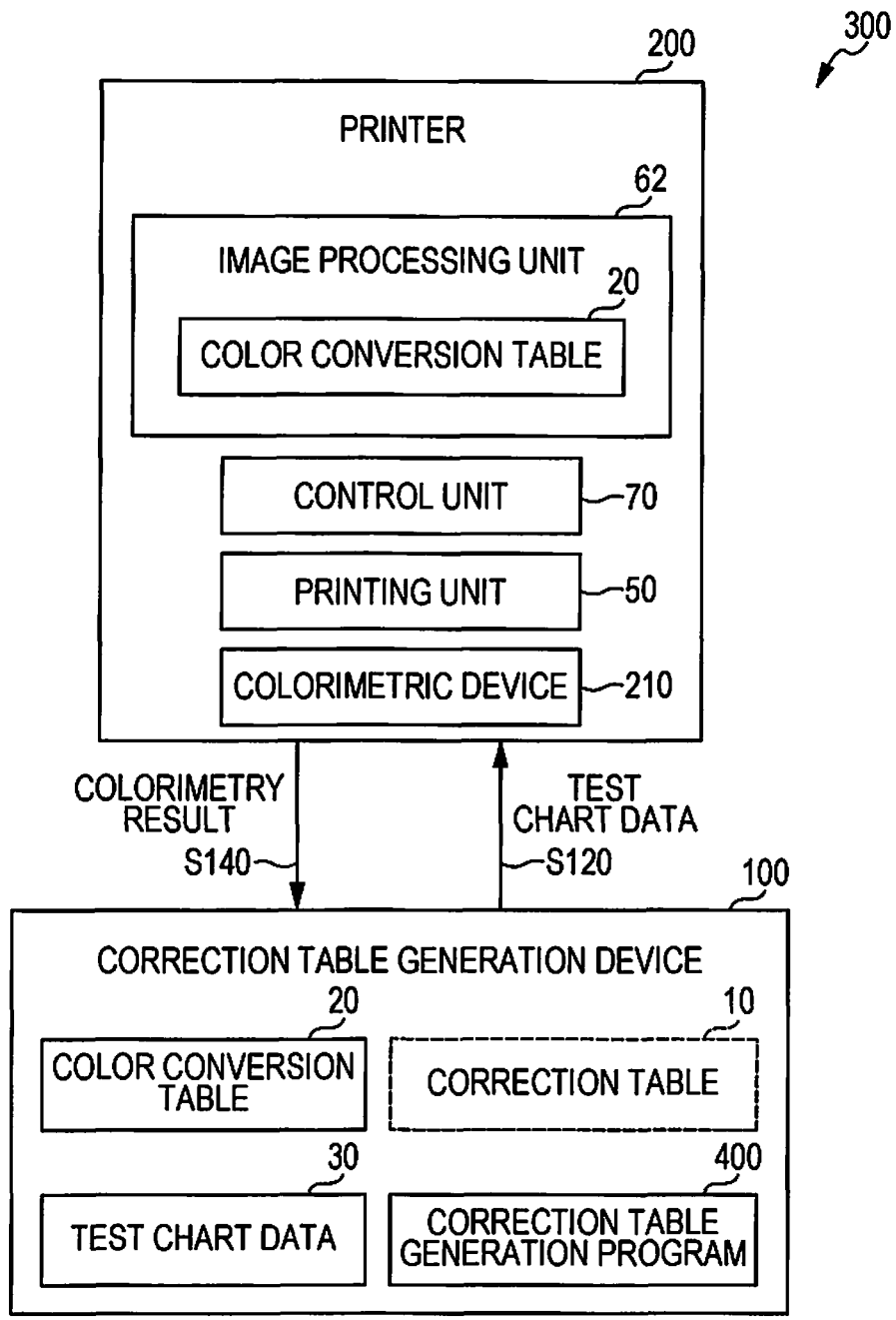
FIG. 2 is a block diagram illustrating a correction table generation system.

FIG. 2 is a block diagram illustrating a correction table generation system 300. The correction table generation system 300 includes a correction table generation device 100 and a printer 200.

The printer 200 includes a printing unit 50, an image processing unit 62, a control unit 70, and a colorimetric device 210. The printer 200 is the same printer as the printer PR1 illustrated in FIG. 1 except that the colorimetric device 210 is included and the image processing unit 62 is different from that of the printer PR1, and executes printing according to multi-gradation color image data. The image processing unit 62 includes the same color conversion table 20 as that of the printer PR1 (FIG. 1) and does not include the CM table 40 and the correction table 10. That is, the input and output characteristics of the printer 200 are determined by the color conversion table 20.

The colorimetric device 210 performs colorimetry on the printed matter prepared by the printer 200 and the printed matter prepared by another printing apparatus. A colorimetry result is represented by a color value (in the following, referred to as apparatus non-dependent value) of the apparatus non-dependent color system. In the present embodiment, a CIE-LAB color system is used as the apparatus non-dependent color system. As the apparatus non-dependent color system, another known color system, for example, such as CIE-Luv may be used.

The correction table generation device 100 is a computer including an operation device (CPU), a storage device (a ROM, a RAM, a HDD, a memory, or the like), an input and output interface, or the like. The correction table generation device 100 stores a correction table generation program 400, a color conversion table 20, and test chart data 30 in the storage device. The color conversion table 20 is the same as the color conversion table 20 included in the printer 200, a configuration in which the color conversion table 20 is equipped in the correction table generation device 100 in advance may be available, or a configuration in which the color conversion table 20 is acquired by the correction table generation device 100 from outside may be available. Test chart data 30 is color image data represented by a value (coordinate value) of a four-dimensional apparatus dependent color system. As will be described later in detail, the correction table generation device 100 executes the correction table generation program 400 to implement correction table generation processing that generates the correction table 10 used for correcting an input value of the color conversion table 20 included in the printer 200 using the color conversion table 20, the test chart data 30, and the colorimetry result by the colorimetric device 210 of the printer 200.

In the present embodiment, the correction table generation device 100 generates the correction table 10 including a four-dimensional conversion table CT4 (FIG. 4). Here, the four-dimensional conversion table CT4 is a table in which a Lab value (apparatus non-dependent color system) obtained from the CMYK value (four-dimensional apparatus dependent color system) by referring to target characteristics is converted into a four-dimensional CMYK value by which the same Lab value can be reproduced by referring to basic characteristics. The "target characteristics" are characteristics that the Lab value and the CMYK value have linearity and the "basic characteristics" are characteristics indicating a relationship between the Lab value which is the colorimetry result of the printed matter formed according to the color conversion table 20 and the input value (CMYK value) of the color conversion table 20. In other words, the four-dimensional conversion table CT4 is a table with which the same Lab value can be reproduced and in which a second apparatus dependent value CMYK2, which is a CMYK value obtained from target characteristics, is set as an input and a first apparatus dependent value CMYK1, which is a CMYK value obtained from basic characteristics, is set as an output. The number of input lattice points of the four-dimensional conversion table CT4 can be set to, for example, 83,521 ($17^4$). The number of input lattice points of the four-dimensional conversion table CT4 may be the same as or may be different from the number of input lattice points of the color conversion table 20. In the present embodiment, the four-dimensional conversion table is also referred to as a "multi-dimensional conversion table". In the present embodiment, the basic characteristics are also referred to as the "color conversion table color value characteristics".

Figure 3:
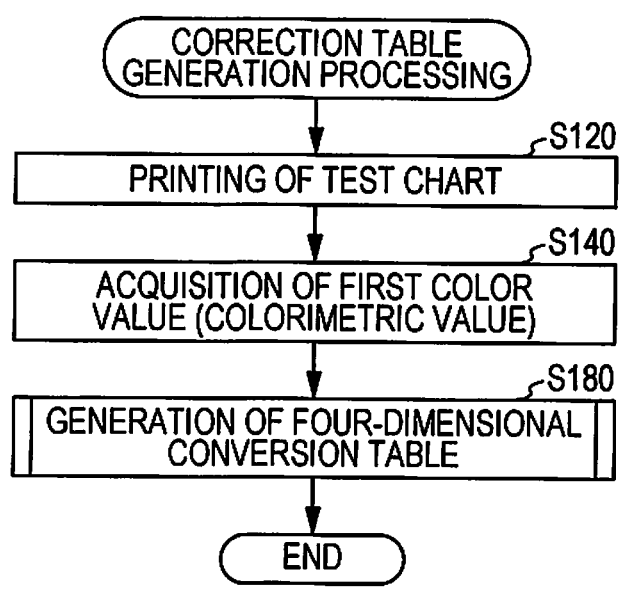
FIG. 3 is a flowchart illustrating a flow of correction table generation processing.

FIG. 3 is a flowchart illustrating a flow of correction table generation processing.

In Step S120, a test chart is printed by the printer 200 (FIG. 2). Specifically, the correction table generation device 100 supplies test chart data 30 to the printer 200 and accordingly, the printer 200 conducts conversion by the color conversion table 20 for test chart data 30 and forms a print image (test chart) according to test chart data 30.

In Step S140, the correction table generation device 100 acquires first color values corresponding to all input values to the color conversion table 20 due to test chart data 30. Specifically, the printer 200 measures a color value of the test chart formed in Step S120 by a colorimetric device 210 which is its own device and outputs the color value to the correction table generation device 100. In FIG. 2, data exchange between the correction table generation device 100 and the printer 200 is described together with step numbers.

In Step S180, the correction table generation device 100 generates a four-dimensional conversion table using the first color values acquired in Step S140.

FIG. 4 is a flowchart illustrating a flow of four-dimensional conversion table generation processing.

In Step S184, the correction table generation device 100 determines a target color value for four dimensions. The target color value for four dimensions is a Lab value having approximate linearity over four dimensions (four-dimensionally) with respect to the CMYK value. The target color value for four dimensions is determined so that an object function E, which will be described later, becomes minimum. In the first embodiment, a "target color value for four dimensions" is referred to as a "target color value for multiple dimensions".

The object function E is generated in such a way that a one-dimensional cubic spline function is defined for all of four dimensions (CMYK) constituting a color system (apparatus dependent color system) of the printer 200 and is generated using cubic spline functions of all dimensions. In the present embodiment, the object function E is defined as a total sum, in all of four dimensions, of a square sum of a second-order differential parameter of a cubic spline function in each dimension.

Specifically, the one-dimensional cubic spline function is defined by setting input values $x_{i-1}$, $x_i$, and $x_{i+1}$ as independent variables and corresponding color values $y_{i-1}$, $y_i$, and $y_{i+1}$ as dependent variable in a lattice point, which is identified by i−1, i, and i+1 and is the lattice point of the color conversion table 20. Each of a C value, an M value, a Y value, and a K value of the four-dimensional input value (CMYK value) is set as x and each of an L value, an a value, and a b value of a three-dimensional color value (Lab value) is set as y.

The correction table generation device 100 selects one lattice point (target lattice point) which determines a target color value for four dimensions, and determines the target color value for four dimensions, and determines a reproduction color value of the lattice point by processing of Step S186 which will be described later. The reproduction color value is a color value used for obtaining the first apparatus dependent value CMYK1 in Step S186 which will be described later and approximately coincides with the target color value for four dimensions. A target color value for four dimensions of a lattice point which is a next processing target is determined using the reproduction color value which is already determined. As a method for selecting a target lattice point, a known technology described in JP-A-2011-223345 is used. In the present embodiment, similar to the selection method described in JP-A-2011-223345, the lattice point numbers from 1 to N are assigned in order for N lattice points per one dimension of the color conversion table 20, the processing order of lattice points, of which numbers are 1 and N, respectively, and which are both end points, are set as 1 and 2, respectively, and a bisection method based on the lattice point number is used so as to set the processing order of the lattice point, of which the lattice point is the (1+N)/2 (integer), as 3. Thereafter, the same processing is executed for the lattice points of all numbers and the lattice points, for which the reproduction color value is not determined, are sequentially selected according to the determined processing order.

According to the processing order determination method described above, a target lattice point for which a target color value for four dimensions is to be determined is set as an intermediate lattice point, the lattice points of end points of which the reproduction color value is determined so as to sandwich the intermediate lattice point therebetween are present, and accordingly, it is possible to form a basic configuration of the processing target by three lattice points. The correction table generation device 100 determines the target color value for four dimensions so that the object function E becomes minimum, while changing the target lattice point.

The one-dimensional cubic spline function for an independent variable x and a dependent variable y between the lattice points $x_i$ and $x_{i+1}$ is defined as an expression 1)

$$y = \frac{x_{i+1} - x}{x_{i+1} - x_i} y_i + \frac{x - x_i}{x_{i+1} - x_i} y_{i+1} + \quad (1)$$
$$\frac{1}{6}\left(\left(\frac{x_{i+1} - x}{x_{i+1} - x_i}\right)^3 - \frac{x_{i+1} - x}{x_{i+1} - x_i}\right)(x_{i+1} - x_i)^2 y_i'' +$$
$$\frac{1}{6}\left(\left(\frac{x - x_i}{x_{i+1} - x_i}\right)^3 - \frac{x - x_i}{x_{i+1} - x_i}\right)(x_{i+1} - x_i)^2 y_{i+1}''$$

If the expression (1) is differentiated with respect to x, an expression (2) is obtained.

$$y' = \frac{1}{x_{i+1} - x_i}(y_{i+1} - y_i) - \quad (2)$$
$$\frac{1}{2}\frac{(x_{i+1} - x)^2}{x_{i+1} - x_i} y_i'' \frac{1}{2}\frac{(x - x_i)^2}{x_{i+1} - x_i} y_{i+1}'' - \frac{1}{6}(x_{i+1} - x_i)(y_{i+1}'' - y_i'')$$

By a condition that inclinations in $x_i$ are coincident with each other in the expression (1), an expression (3) can be obtained by the expression (2) which targets $x_{i-1} \leq x \leq x_i$ and the expression (2) which targets $x_i \leq x \leq x_{i+1}$.

$$\frac{x_i - x_{i-1}}{6} y_{i+1}'' \frac{x_{i+1} - x_{i-1}}{3} y_i'' + \frac{x_{i+1} - x_i}{6} y_{i+1}'' = \frac{y_{i+1} - y_i}{x_{i+1} - x_i} - \frac{y_i - y_{i-1}}{x_i - x_{i-1}} \quad (3)$$

Here, it is indicated that i identifies a lattice point and Y″ is a second-order differential parameter in the lattice point.

When an equation, which is obtained by respectively substituting $x=x_{i-1}$ and $x=x_{i+1}$ into the expression (3), the expression (2) of $x_{i-1} \leq x \leq x_i$, and the expression (2) of $x_i \leq x \leq x_{i+1}$, is arranged, an expression (4) is obtained.

$$\begin{bmatrix} y_{i-1}'' \\ y_i'' \\ y_{i+1}'' \end{bmatrix} = A^{-1} B \begin{bmatrix} y_{i-1} \\ y_i \\ y_{i+1} \end{bmatrix} + c \quad (4)$$

However, A and B indicate matrices and C indicates a vector, and A, B, and C can be respectively defined by the expression (5) to the expression (7). −1 of superscript of the matrix A represents that an inverse matrix thereof is to be obtained.

$$A = \begin{bmatrix} -\dfrac{x_i - x_{i-1}}{3} & -\dfrac{x_i - x_{i-1}}{6} & 0 \\ \dfrac{x_i - x_{i-1}}{6} & \dfrac{x_{i+1} - x_{i-1}}{3} & \dfrac{x_{i+1} - x_i}{6} \\ 0 & \dfrac{x_{i+1} - x_i}{6} & \dfrac{x_{i+1} - x_i}{3} \end{bmatrix} \quad (5)$$

$$B = \begin{bmatrix} \dfrac{1}{x_i - x_{i-1}} & -\dfrac{1}{x_i - x_{i-1}} & 0 \\ \dfrac{1}{x_i - x_{i-1}} & -\dfrac{x_{i+1} - x_{i-1}}{(x_{i+1} - x_i)(x_i - x_{i-1})} & \dfrac{1}{x_{i+1} - x_i} \\ 0 & \dfrac{1}{x_{i+1} - x_i} & -\dfrac{1}{x_{i+1} - x_i} \end{bmatrix} \quad (6)$$

$$c = \begin{bmatrix} y'_{i-1} \\ 0 \\ y'_{i+1} \end{bmatrix} \quad (7)$$

In the left side of the expression (4), a second-order differential parameter of the cubic spline function can be obtained and thus, when it is intended to set the square sum of the second-order differential parameter as an object function, an expression (8) can be obtained.

$$E = y''^2_{i-1} + y''^2_i + y''^2_{i+1} \quad (8)$$

As it is evident from the expression (4), the expression (8) is a function of an unknown dependent variable $y_i$ and thus, $y_i$ which minimizes the expression (8) is obtained so as to make it possible to obtain the Lab value having approximate linearity with respect to the CMYK value in one dimension.

Here, the color system of the printer 200 is a four-dimensional color system and thus, the same object function as the expression (8) is generated for each dimension and the object functions for all dimensions (four dimensions) are summed up to be set as an object function E. When i, j, . . . are set as dimension identifications and $E_i$, $E_j$, . . . are set as respective object functions, the object function for determining the target color value for four dimensions is defined as an expression (9).

$$E = E_i + E_j + \quad (9)$$

The target color value for four dimensions in the lattice points at the farthest end points corresponding to the lattice points having a number 1 and a number N when the number of lattice points in the one dimension is N coincides with the first color value acquired in Step S140.

In Step S186, the correction table generation device 100 obtains the first apparatus dependent value CMYK1 corresponding to a second apparatus dependent value CMYK2. Specifically, the correction table generation device 100 obtains the first apparatus dependent value CMYK1 corresponding to the second apparatus dependent value CMYK2 by interpolation using basic characteristics BL4 (relationship between the first color value and the input value of the color conversion table 20) obtained by the first color value acquired in Step S140 and target characteristics TL4 (relationship (linearity) between the target color value for four dimensions and the input value of the color conversion table 20) obtained in Step S184. Here, although linear interpolation is used as an interpolation method, other known interpolation methods such as spline interpolation, Bezier interpolation, and the like may be used. Interpolation in the following respective steps is also similar to matters described above.

When it is intended to obtain the first apparatus dependent value CMYK1, in a case where the target color value for four dimensions can be reproduced in basic characteristics, the target color value for four dimensions is fixed as the reproduction color value and in a case where the target color value for four dimensions cannot be reproduced in basic characteristics, a first apparatus-dependent CMYK1 capable of reproducing a color value that minimizes a color difference from the target color value for four dimensions is obtained from among reproducible color values and the obtained color value is fixed as the reproduction color value. The case where the target color value for four dimensions cannot be reproduced in the basic characteristics, the printer 200 corresponds to a case where the color value is deviated from a gamut of the printer 200.

In Step S188, the correction table generation device 100 generates a four-dimensional conversion table CT4 in which an input is set as the second apparatus dependent value CMYK2 and an output is set as the first apparatus dependent value CMYK1. The correction table 10 including the four-dimensional conversion table CT4 is generated.

As illustrated in FIG. 1, the correction table 10 and the color conversion table 20 are applied to the printer PR1 used by a user. A configuration in which a color conversion table obtained by correcting the color conversion table 20 using the correction table 10 is applied to a printer to be used by the user may be available.

As described above, according to the correction table generation method of the present embodiment, it is possible to calculate the first apparatus dependent value CMYK1 capable of reproducing the Lab value, which is obtained using the target characteristics, from the second apparatus dependent value CMYK2 by using the basic characteristics and generate the correction table 10 including the four-dimensional conversion table CT4 in which the second apparatus dependent value CMYK2 is correlated with the first apparatus dependent value CMYK1. The second apparatus dependent value CMYK2 has approximate linearity with respect to the color value (Lab value) over four dimensions. For that reason, when the correction table 10 generated by the correction table generation method of the present embodiment is applied to the printer PR1 as illustrated in FIG. 1, the input and output characteristics are linearized and the printed matter having the color value linearized with respect to CMYK data before being converted by the correction table 10 can be obtained.

According to the correction table generation method of the first embodiment, the degree of linearization is not different for each dimension by being depended on a processing sequence and linearity is secured over four dimensions, compared to a method in which one-dimensional linearization in which other dimensions are fixed is repeated sequentially for every one dimension.

According to the correction table generation method of the first embodiment, processing efficiency is high and processing time is reduced compared to a method in which one-dimensional linearization in which other dimensions are fixed is repeated sequentially for every one dimension.

B. Second Embodiment

Figure 5A:
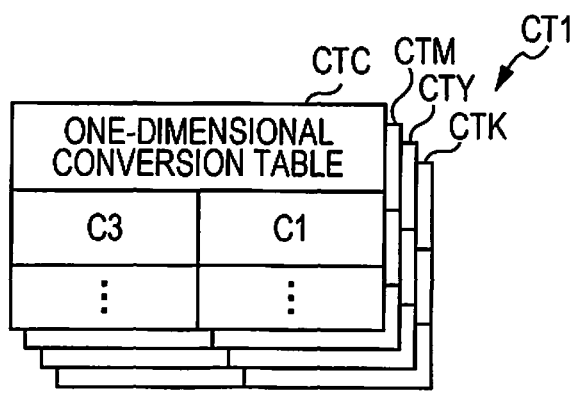
FIG. 5A is an explanatory diagram for explaining a one-dimensional conversion table generated in a correction table generation method of a second embodiment.
Figure 5B:
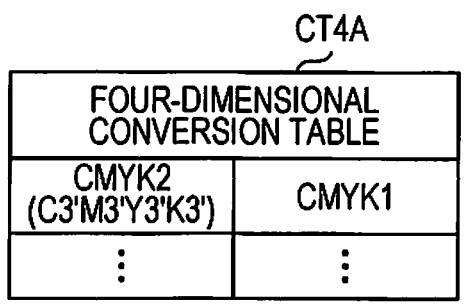
FIG. 5B is an explanatory diagram for explaining a four-dimensional conversion table generated in the correction table generation method of the second embodiment.

FIG. 5A is an explanatory diagram for explaining a one-dimensional conversion table CT1 generated in a correction table generation method of a second embodiment. FIG. 5B is an explanatory diagram for explaining a four-dimensional conversion table CT4A generated in the correction table generation method of the second embodiment. Although the correction table generation method of the second embodiment is different from the correction table generation method of the first embodiment in that one-dimensional conversion table CT1 is generated in addition to the four-dimensional conversion table CT4A, but other steps of the correction table generation method of the present embodiment are the same as those of the first embodiment and thus, description of the other steps will be omitted. Also, the correction table generation method of the present embodiment is also implemented by the correction table generation system 300 illustrated in FIG. 2. The correction table generation program 400 is replaced with a program in which steps which will be described are executed by the correction table generation device 100.

The one-dimensional conversion table CT1 generated in the correction table generation method of the present embodiment is four tables of a C value conversion table CTC which is a one-dimensional conversion table for the C value, an M value conversion table CTM which is a one-dimensional conversion table for the M value, a Y value conversion table CTY which is a one-dimensional conversion table for the Y value, and a K value conversion table CTK which is a one-dimensional conversion table for the K value (FIG. 5A). Hereinafter, in a case where it is not intended to distinguish the C value conversion table CTC, the M value conversion table CTM, the Y value conversion table CTY, and the K value conversion table CTK, the tables are also referred to as the one-dimensional conversion table CT1. The C value conversion table CTC is a table with which a C value (third apparatus dependent value) generated by calculating a C value (first apparatus dependent value), which is capable of reproducing a color value calculated from the C value (third apparatus dependent value) using one-dimensional target characteristics, using the basic characteristics is converted into a C value (first apparatus dependent value). Similarly, the M value conversion table CTM, the Y value conversion table CTY, and the K value conversion table CTK are tables with which, for a target dimension, a value of the apparatus dependent color system is converted into a value of the apparatus dependent color system calculated using one-dimensional target characteristics and the basic characteristics by interposing the color value. The "one-dimensional target characteristics" are characteristics that the Lab value, the C value, the M value, the Y value, and the K value (one dimension) respectively have linearity. The number of input lattice points of each one-dimensional conversion table CT1 is 256 and the third apparatus dependent value which is an input value is preferably a value of a piece (0, 1, 2, . . . , 254, 255) of values of 0 to 255. That is, the number of input lattice points of each one-dimensional conversion table CT1 is greater than the number of input lattice points of the four-dimensional conversion table CT4A.

Similar to the four-dimensional conversion table CT4, the four-dimensional conversion table CT4A (FIG. 5B) is a table in which a specific CMYK value and a CMYK value obtained from the specific CMYK value using the target characteristics and the basic characteristics by interposing the color value are correlated with each other. However, the input and output values in the four-dimensional conversion table CT4A are determined using the one-dimensional conversion table CT1 and thus, the input and out values become values different from those of the four-dimensional conversion table CT4 of the first embodiment.

Figure 6:
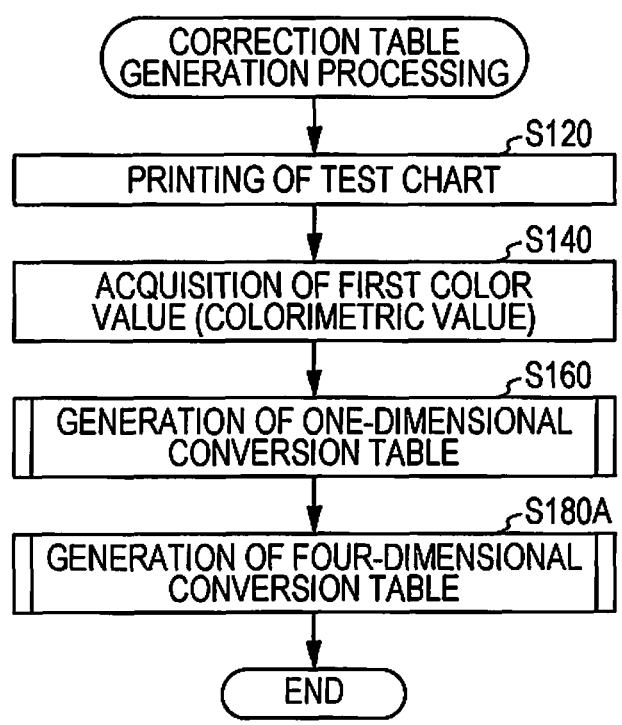
FIG. 6 is a flowchart illustrating a flow of correction table generation processing of the second embodiment.

FIG. 6 is a flowchart illustrating a flow of correction table generation processing of the second embodiment. The correction table generation processing of the second embodiment includes one-dimensional conversion table generation processing (Step S160) between first color value acquisition processing (Step S140) and four-dimensional conversion table generation processing (Step S180) in the correction table generation processing (FIG. 3) of the first embodiment. As a result, four-dimensional conversion table generation processing (Step S180A) is different from the first embodiment. Steps S120 and S140 in correction table generation processing of the second embodiment are the same as those of the first embodiment and thus, description thereof will be omitted.

Figure 7:
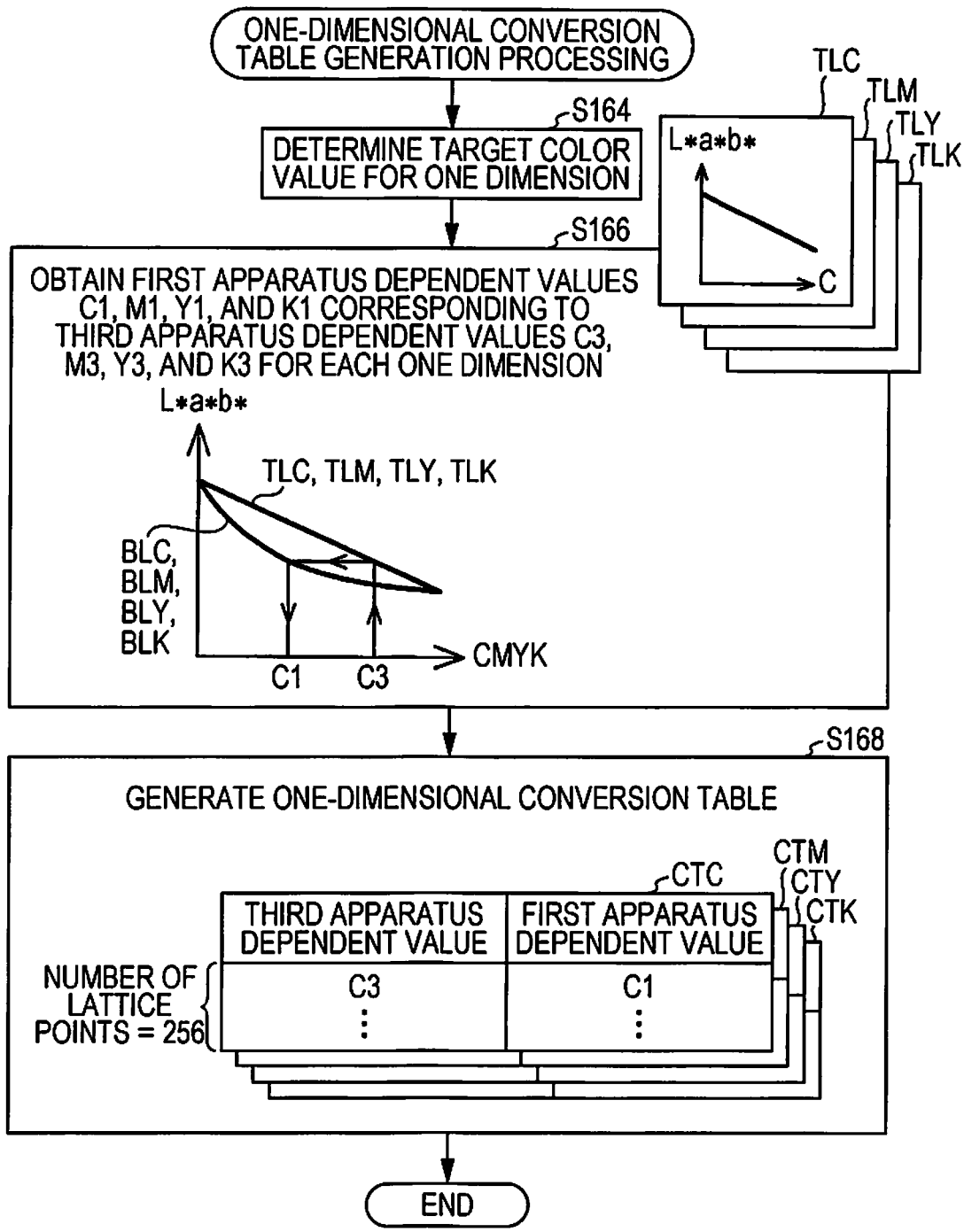
FIG. 7 is a flowchart illustrating a flow of one-dimensional conversion table generation processing.

FIG. 7 is a flowchart illustrating a flow of one-dimensional conversion table generation processing.

In Step S164, the correction table generation device 100 determines the target color value for one dimension. The target color value for one dimension is a Lab value having linearity with respect to each of the C value, the M value, the Y value, and the K value. It is possible to determine the target color value for one dimension by performing, for example, linear interpolation between a first color value for the minimum value (0) of the C value and another first color value for the maximum value (255) of the C value. Matters described above are also similarly applied to other dimensions (M value, Y value, and K value). As the first color value, a value obtained in Step S140 is used. As the first color value for the minimum value (0) of the C value, a first color value corresponding to (C, M, Y, K) (0, 0, 0, 0) is used and as the first color value for the maximum value (255) of the C value, a first color value corresponding to (C, M, Y, K)=(255, 0, 0, 0) is used. Matters described above are also similarly applied to other dimensions.

In Step S166, the correction table generation device 100 obtains the first apparatus dependent values C1, M1, Y1, and K1 corresponding to the third apparatus dependent values C3, M3, Y3, and K3 for each one dimension. The third apparatus dependent values are inputs of the one-dimensional conversion table and values of the apparatus dependent color system. The first apparatus dependent values are values of the apparatus dependent color system in which the third apparatus dependent values are obtained by using one-dimensional target characteristics and the basic characteristics. Also, although the value of the apparatus dependent color system obtained by using the target characteristics and the basic characteristics is referred to as the first apparatus dependent value in the first embodiment and the second embodiment, the first apparatus dependent values C1, M1, Y1, and K1 which are output values of one-dimensional conversion table CT1 of the second embodiment are values different from the first apparatus dependent values CMYK1 which are output values of the four-dimensional conversion table of the first embodiment.

Specifically, the correction table generation device 100 obtains the first apparatus dependent value C1 corresponding to the third apparatus dependent value C3 by interpolation by using basic characteristics BLC (relationship between the first color value and an input value (C value) of the color conversion table 20) obtained by the first color value acquired in Step S140 and one-dimensional target characteristics TLC obtained in Step S164. In the second embodiment, the third apparatus dependent value C3 is a value (0, 1, 2, . . . , 254, 255) of a piece of values of 0 to 255 as described above. The values are also similarly obtained for other dimensions.

In Step S168, the correction table generation device 100 generates the C value conversion table CTC in which an input is set as the third apparatus dependent value C3 and an output is set as the first apparatus dependent value C1. Similarly, the correction table generation device 100 generates the M value conversion table CTM, the Y value conversion table CTY, and the K value conversion table CTK. That is, the correction table generation device 100 generates four one-dimensional conversion tables CT1.

Figure 8A:
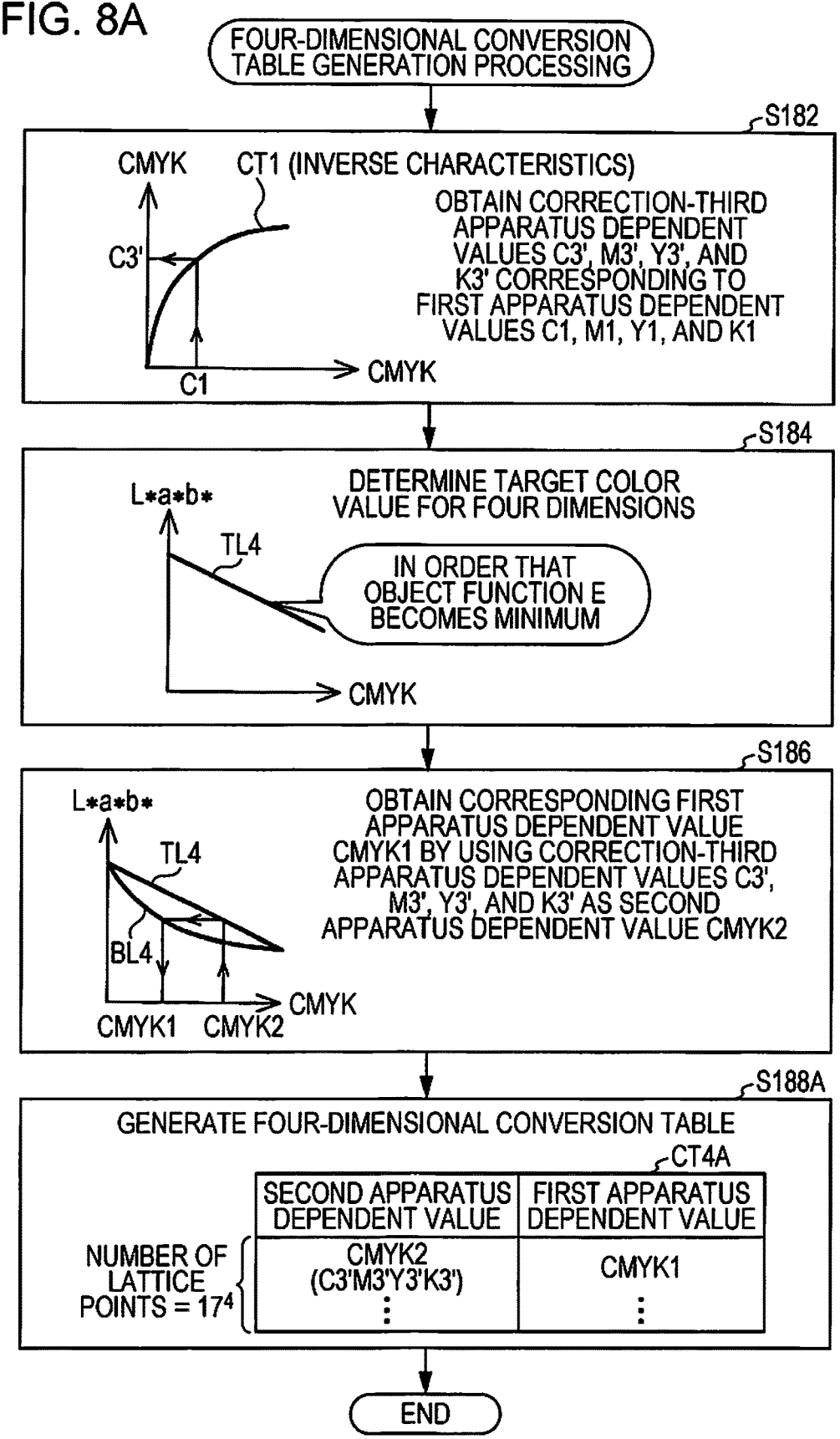
FIG. 8A is a flowchart illustrating a flow of four-dimensional conversion table generation processing of the second embodiment.

FIG. 8A is a flowchart illustrating a flow of four-dimensional conversion table generation processing of the second embodiment. In Step S182, the correction table generation device 100 obtains correction-third apparatus dependent values C3', M3', Y3', and K3' corresponding to the first apparatus dependent values C1, M1, Y1, and K1 by inverse one-dimensional conversion using the one-dimensional conversion table CT1. Here, in the sense that the correction-third apparatus dependent value is different from the third apparatus dependent value used in the one-dimensional conversion table CT1 and the correction-third apparatus dependent value is the third apparatus dependent value obtained by inverse one-dimensional conversion, it is referred to as the "correction-third apparatus dependent value".

In Step S184, the correction table generation device 100 determines the target color value for four dimensions. Processing performed in Step S184 is the same as that in Step S184 in the first embodiment. However, as a substitution value of the independent variable x, the correction-third apparatus dependent value obtained in Step S182 is used.

In Step S186, similar to the first embodiment, the correction table generation device 100 obtains the first apparatus dependent value CMYK1 corresponding to the second apparatus dependent value CMYK2. Specifically, the correction table generation device 100 obtains the first apparatus dependent value CMYK1 corresponding to the second apparatus dependent value CMYK2 by interpolation using the basic characteristics BL4 (relationship between the first color value and the input value of the color conversion table 20) obtained by the first color value acquired in Step S140 and the target characteristics TL4 (relationship (linearity) between the target color value for four dimensions and the input value of the color conversion table 20) obtained in Step S184. In the second embodiment, as the second apparatus dependent value CMYK2, a combination of the correction-third apparatus dependent values C3', M3', Y3', and K3' is used. For that reason, the first apparatus dependent value CMYK1 becomes a value different from that of the first embodiment.

In Step S188A, the correction table generation device 100 generates a four-dimensional conversion table CT4A in which an input is set as the second apparatus dependent value CMYK2 (combination of correction-third apparatus dependent values C3', M3', Y3', and K3') and an output is set as the first apparatus dependent value CMYK1. The correction table of the second embodiment is constituted with the one-dimensional conversion table CT1 and the four-dimensional conversion table CT4A.

As described above, according to the correction table generation method of the second embodiment, the one-dimensional conversion table and the four-dimensional conversion table are generated. Correction table generation aims to secure linearity over the entire color gamut by four-dimensional conversion. In the four-dimensional conversion table, the number of lattice points of the four-dimensional conversion table is the number of lattice points to the power of 4 for the number of lattice points per one dimension and thus, when the processing load and processing time is taken into account, the number of lattice points per one dimension is suppressed. In a case where non-linearity of CMYK value-Lab value characteristics (basic characteristics) of the color conversion table 20 is relatively high, there is possibility that linearity between the CMYK value input to the four-dimensional conversion table and the Lab value of the printed matter is slightly damaged by an error in the CMYK value-CMYK value conversion by the four-dimensional conversion table. In contrast, according to the second embodiment, correction is performed using the one-dimensional conversion table CT1 of which the number of lattice points is greater than that of the four-dimensional conversion table and the four-dimensional conversion table CT4A and thus, an error in the CMYK value-CMYK value conversion by the four-dimensional conversion table is suppressed compared to the error in the first embodiment. As a result, linearity between the CMYK value input to the correction table (one-dimensional conversion table CT1 and four-dimensional conversion table CT4A) and the Lab value (color value) of the printed matter is further improved.

Figure 8B:
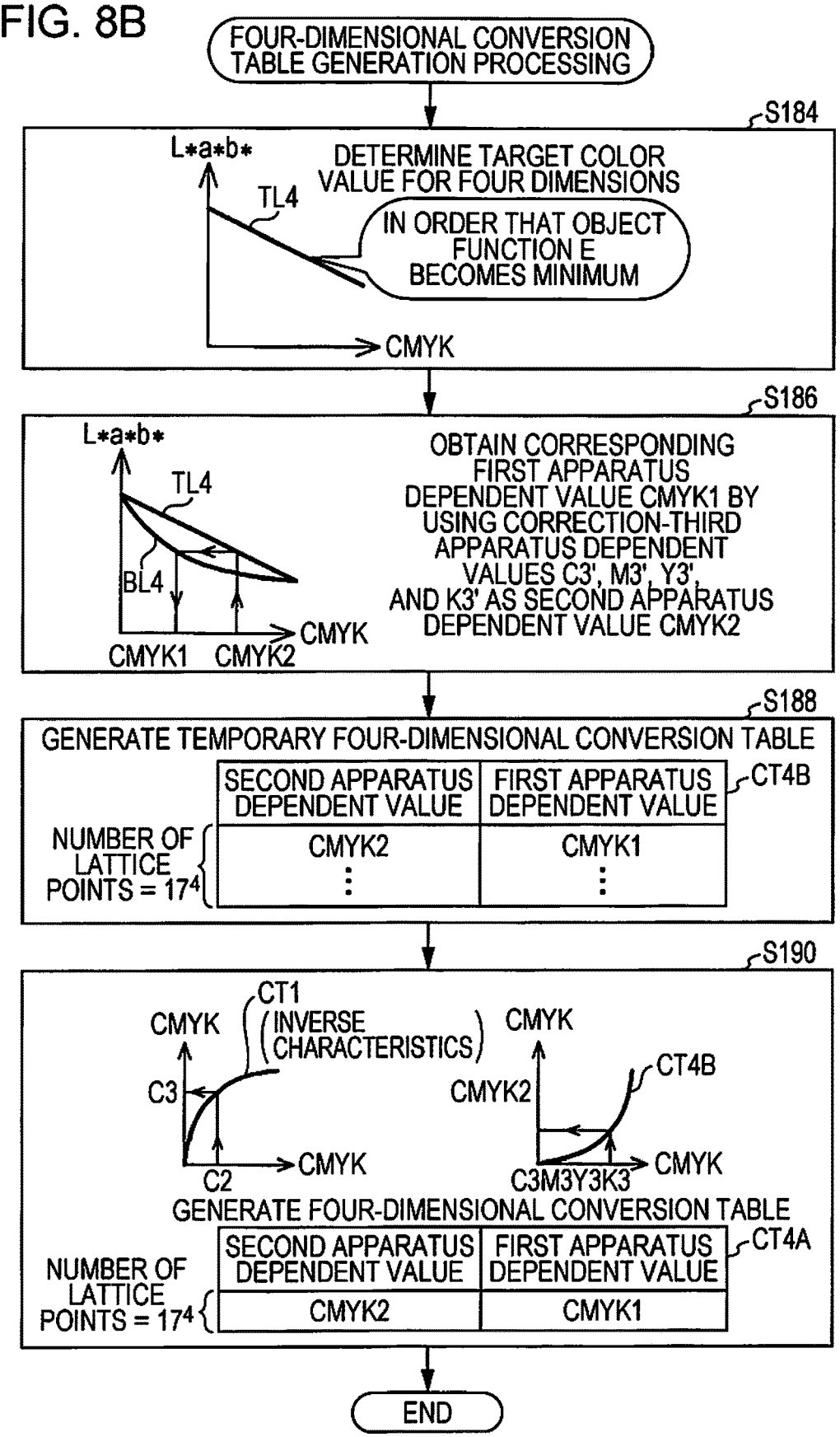
FIG. 8B is another flowchart illustrating the flow of four-dimensional conversion table generation processing of the second embodiment.

Description will be made on another processing flow of a generation method of the four-dimensional conversion table CT4A generation method of the second embodiment will be described using FIG. 8B. Step S184, Step S186, and Step S188 are the same respectively as those in the first embodiment and thus, description thereof will not be made. However, the four-dimensional conversion table generated by these processing is a temporary conversion table used in Step S190 which will be described later and thus, is referred to as a temporary four-dimensional conversion table CT4B.

In Step S190, the four-dimensional conversion table is generated by the first apparatus dependent value CMYK1 obtained by repeating inverse conversion of the one-dimensional conversion table obtained in Step S160 (FIG. 6) and conversion of the temporary the four-dimensional conversion table CT4B for values (second apparatus dependent value CMYK2) of the input lattice points of the four-dimensional conversion table. This corresponds to matters that the first apparatus dependent value CMYK1 of the four-dimensional conversion table CT4 generated by the correction table generation method of the first embodiment is corrected by performing inverse one-dimensional conversion which is inverse conversion of the one-dimensional conversion table CT1 and multi-dimensional conversion by the four-dimensional conversion table CT4. Although the position of the lattice point of the four-dimensional conversion table of FIG. 8A is likely to be deviated from the obtained correction-third apparatus dependent value, the present method is used so as to make it possible to prepare the four-dimensional conversion table CT4A in which deviation is not present in the input lattice point. However, the values of the CT4A obtained in the processing flow of FIG. 8A are different from the values of the CT4A obtained in the processing flow of FIG. 8B.

C. Third Embodiment

In the third embodiment, description will be made on another example of the object function E generated in the target color value determination step (Step S184) for four dimensions. It is possible to use the object function E to be described in the third embodiment instead of the object function E in the first embodiment and the second embodiment.

In the following, although the object function E in the third embodiment will be described, first, for brevity, the object function for a case where the color system (apparatus dependent color system) of the printer is two-dimensional color system and the color value (apparatus non-dependent color system) is one-dimensional color value will be described. In the third embodiment, an object function for which it is expected that a second-order differential parameter of the first cubic spline function and a second-order differential parameter of a second cubic spline function which is adjacent to and is defined in a direction different from the direction that defines the first cubic spline function are as same as possible is generated. Here, the definition direction of the second cubic spline function is the same as the definition direction of the first cubic spline function.

Figure 9:
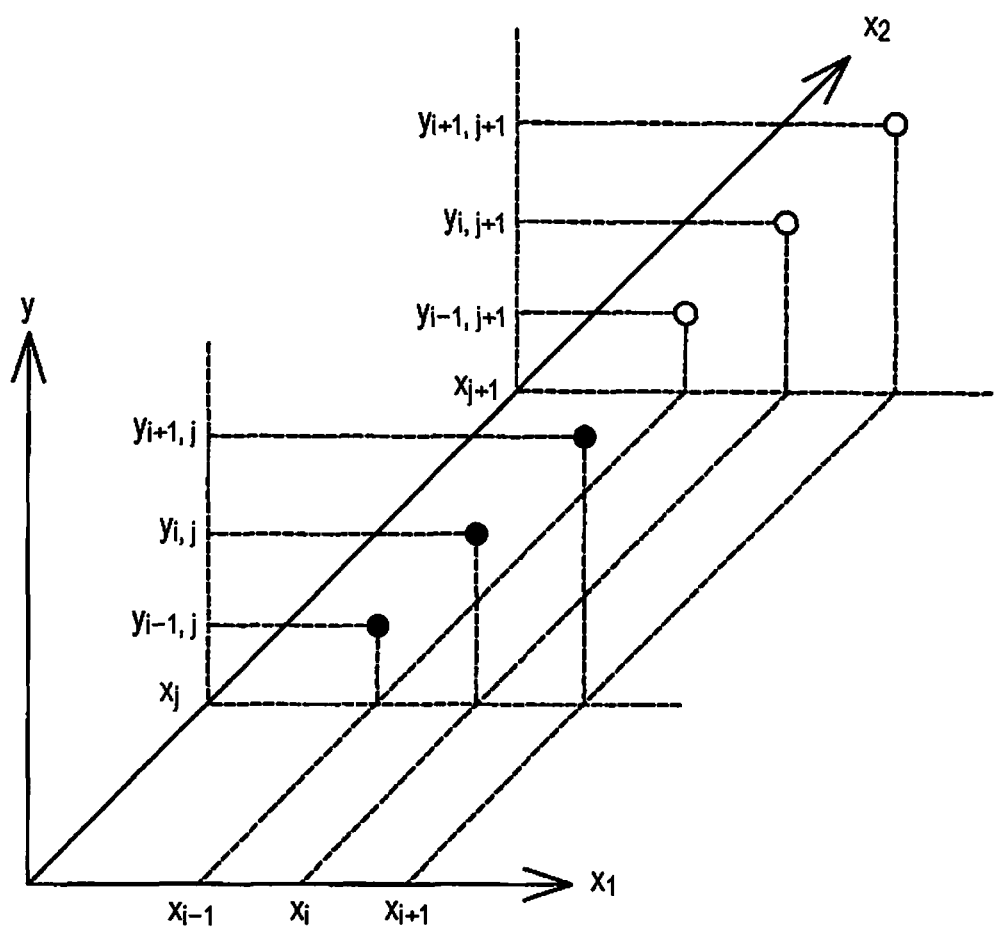
FIG. 9 is a schematic diagram for explaining an object function in a case where a color system (apparatus dependent value) of a printer is a two-dimensional color system and a color value (apparatus non-dependent value) is a one-dimensional value.

FIG. 9 is a schematic diagram for explaining an object function in a case where a color system (apparatus dependent color system) of a printer is a two-dimensional color system and a color value (apparatus non-dependent color system) is a one-dimensional value. First, the $x_i$ direction of FIG. 9 is set as a direction that defines the first cubic spline function, and the first cubic spline function is defined by using dependent variables and $y_{i+1,j}$ of the lattice points along $x_2=x_j$ and independent variables $x_{i-1}$, $x_i$, and $x_{i+1}$ corresponding to $x_1$. In FIG. 9, the first cubic spline function is defined by the dependent variables represented with circles inside of which are filled with black.

Next, the dependent variables of the lattice points of which the color values are known and which are adjacent to each other in the direction different from the definition direction of the first cubic spline function, that is, in the $x_2$ direction in FIG. 9 are represented by $y_{i-i,j+1}$, $y_{i,j+1}$, and $y_{i+1,j+1}$ along $x_2=x_{j+1}$ and the second cubic spline function is defined by using the dependent variables and the independent variable which is the same as that of the first cubic spline function. In FIG. 9, the second cubic spline function is defined by the dependent variables represented with circles inside of which are empty.

In the third embodiment, the correction table generation device 100 generates the square sum of the difference between second-order differential parameters of the first and second cubic spline functions as the object function. However, among the lattice points adjacent to each other in the $x_2$ direction, the lattice points adjacent to each other in the negative direction of $x_2$ are also present.

The object function generated as described above is represented by an expression (10).

$$E = \frac{1}{(x_j - x_{j-1})^2} \left\| \frac{\partial^2}{\partial x_1^2} \begin{bmatrix} y_{i-1j} \\ y_{ij} \\ y_{i+1j} \end{bmatrix} - \frac{\partial^2}{\partial x_1^2} \begin{bmatrix} y_{i-1j-1} \\ y_{ij-1} \\ y_{i+1j-i} \end{bmatrix} \right\|^2 + \tag{10}$$

$$\frac{1}{(x_{j+1} - x_j)^2} \left\| \frac{\partial^2}{\partial x_1^2} \begin{bmatrix} y_{i-1j+1} \\ y_{ij+1} \\ y_{i+1j+1} \end{bmatrix} - \frac{\partial^2}{\partial x_1^2} \begin{bmatrix} y_{i-1j} \\ y_{ij} \\ y_{i+1j} \end{bmatrix} \right\|^2 +$$

$$\frac{1}{(x_i - x_{i-1})^2} \left\| \frac{\partial^2}{\partial x_2^2} \begin{bmatrix} y_{ij-1} \\ y_{ij} \\ y_{ij+1} \end{bmatrix} - \frac{\partial^2}{\partial x_2^2} \begin{bmatrix} y_{i-1j-1} \\ y_{i-1j} \\ y_{i-1j+1} \end{bmatrix} \right\|^2 +$$

$$\frac{1}{(x_{i+1} - x_i)^2} \left\| \frac{\partial^2}{\partial x_2^2} \begin{bmatrix} y_{i+1j-1} \\ y_{i+1j} \\ y_{i+1j+1} \end{bmatrix} - \frac{\partial^2}{\partial x_2^2} \begin{bmatrix} y_{ij-1} \\ y_{ij} \\ y_{ij+1} \end{bmatrix} \right\|^2$$

The second-order differential parameter $\partial^2 y/\partial x^2$ of the expression (10) is obtained by y" of the expression (4) of the first embodiment and thus, similar to the first embodiment, the object function capable of being acquired in the expression (10) is a function for an unknown dependent variable $y_{i,j}$.

In the present embodiment, the color system of the printer is a four-dimensional color system and thus, the number of directions defining adjacency relationship between the first and second cubic spline functions is increased and accordingly, terms can be added by the number of increased directions in the object function and furthermore, the directions defining the first and second cubic spline function can also be selected by dimensions of the independent variable and accordingly, the object function to which such terms are added is set as the object function E. Even in a case where the color system of the printer is a five or more dimensional color system, similarly, terms corresponding to the increased amount of directions defining adjacency relationship and the increased amount according to the number of dimensions of the independent variables of the directions of that defines the cubic spline function are added to the object function to thereby make it possible to define the same object function.

An outline of a color reproduction area of a general printer forms a curved surface in color value space and thus, it is impossible to physically implement complete linearity, but the object function E of the third embodiment is used so as to make it possible to determine the color value having approximate linearity over four dimensions with respect to the CMYK value most preferably while following a curved surface of an outline surface.

D. Fourth Embodiment

In the fourth embodiment, description will be made on a correction table generation method in a case where the color system of the printer is a five-dimensional color system. In the fourth embodiment, the color system of the printer is a CMYKR color system obtained by adding R (Red) which is a specific color to the CMYK color system which is the color system of the printer in the first to third embodiments. That is, the number of dimensions of the color system of the printer is increased by one dimension. In the fourth embodiment, a value (coordinate value) of the apparatus dependent color system is a CMYKR value. A correction table of the fourth embodiment includes a five-dimensional conversion table. The five-dimensional conversion table is a table that converts a certain CMYKR value (five-dimensional apparatus dependent color system) into a CMYKR value capable of reproducing a color value which is appropriately linear with respect to the CMYKR value using target characteristics and basic characteristics. The correction table generation method of the fourth embodiment can be explained by changing a four-dimension and CMYK in the first to third embodiments with a five-dimension and CMYKR in reading, respectively, and replacing the determination step (Step S186) of the first apparatus dependent value CMYK1 in the four-dimensional conversion table generation processing in the first to third embodiments with a determination step of a first apparatus dependent value CMYKR1 which will be described in the following.

Figure 10:
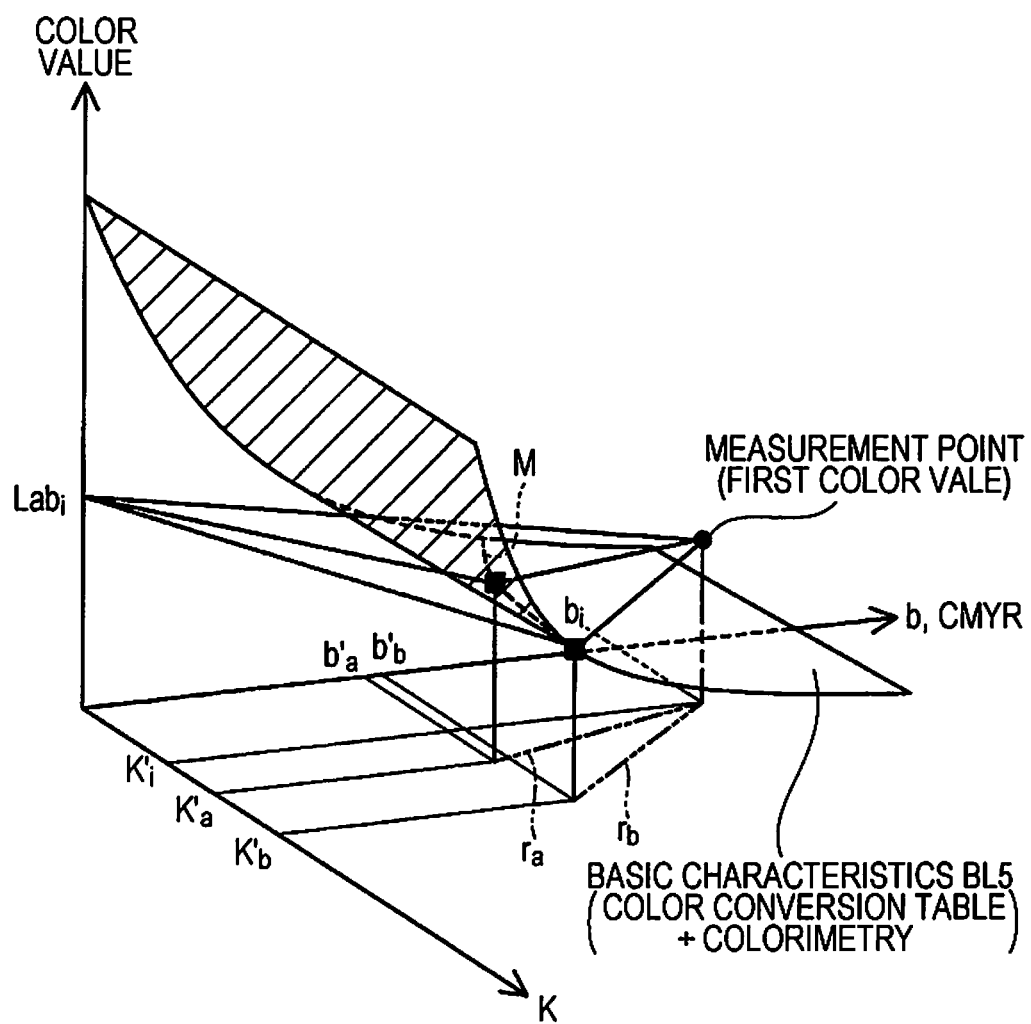
FIG. 10 is a graph schematically illustrating basic characteristics in a fourth embodiment.

FIG. 10 is a graph schematically illustrating basic characteristics BL5 in a fourth embodiment. FIG. 10 corresponds to the graph illustrated within the boxes of Step S186 of FIGS. 4, 8A, and 8B in the first and second embodiments. In FIG. 10, the apparatus dependent color system is illustrated as the two-dimensional apparatus dependent color system. The values of the illustrated apparatus dependent color system are a K value and a b value which is obtained by converting CMYR into one-dimensional value. The five-dimensional basic characteristics BL5 obtained by the color conversion table and colorimetry is represented as a curved surface. The hatching illustrated in FIG. 10 indicates a rear surface of the curved surface.

In the present embodiment, the dimension of the color value with respect to the apparatus dependent value is less than that of the apparatus non-dependent value and thus, a plurality of combinations each of which implements a certain Lab value are present basically. Although this is also the same in the first to third embodiments, for simplifying description in the first to third embodiments, the Lab value as well as the apparatus dependent value are set as one-dimensional values and the target characteristics TL4 and the basic characteristics BL4 are depicted to be illustrated as a straight line or a curved line as if an apparatus dependent value implementing a certain Lab value (color value of apparatus non-dependent color system) is uniquely determined.

In the present embodiment, in a case where it is intended to obtain the first apparatus dependent value CMYKR1 corresponding to a second apparatus dependent value CMYKR2 which is an apparatus dependent value, an $Lab_i$ is obtained as a target color value for a second apparatus dependent value $(b_i, K_i)$. In this case, in Step S186, a corresponding first apparatus dependent value CMYKR1 is obtained from the target color value $Lab_i$ and basic characteristics BL5. However, an area at which the basic characteristics BL5 intersects with a plane perpendicular to the color value axis at $Lab_i$ in FIG. 10 is not limited to a single point and thus, the input value is not uniquely determined from the target color value $Lab_i$ and the basic characteristics BL5. That is, as illustrated in FIG. 10, an apparatus dependent value corresponding to a certain point on a curved line M satisfying the color value of $Lab_i$ on the basic characteristics BL5 implements the color value of $Lab_i$. For that reason, as the first apparatus dependent value CMYKR1, for example, $(b'_a, K'_a)$ illustrated in FIG. 10 may be adopted or $(b'_b, k'_b)$ may also be adopted.

Additional description on matters that a plurality of combinations of the apparatus dependent values (CMYKR value) that reproduce the same color value (Lab value) are present as described above will be provided.

Figure 11:
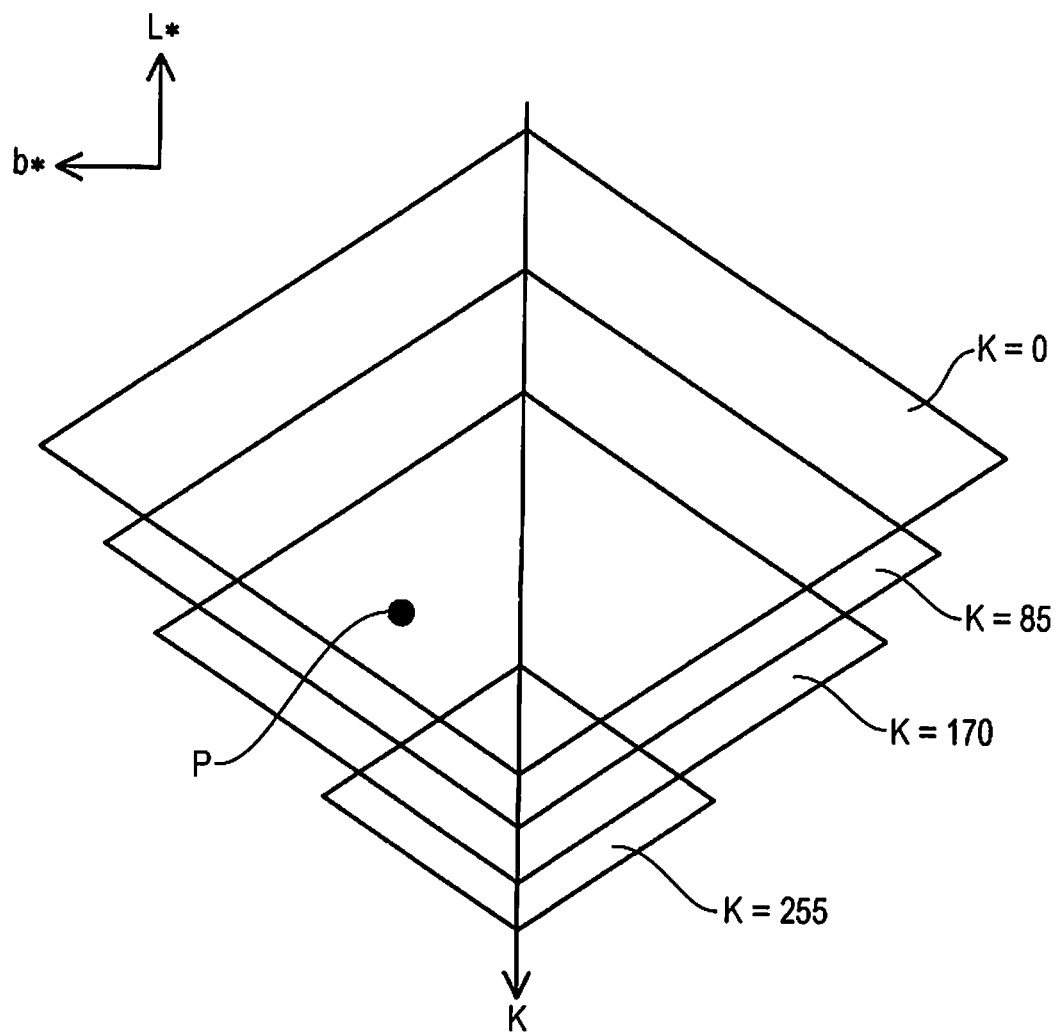
FIG. 11 is an explanatory diagram illustrating color value space capable of being reproduced for each lattice point of a K value.

FIG. 11 illustrates color value space capable of being reproduced for each lattice point of a K value. In FIG. 11, color value space for only four K values of K=0, 85, 170, and 255 is illustrated. In actual, the color value space is determined for all K values.

For example, a color value P illustrated in FIG. 11 is within a reproduction range in a case of K=0, 85, and 170 and is not within the reproduction range in a case of K=255. In such a case, partial space of CMYR space capable of reproducing the same color value over at least K=0 to 170 is present.

As described above, even when a plurality of apparatus dependent values (CMYKR values) implementing the same color value $Lab_i$ are present, one apparatus dependent value is selected from among the apparatus dependent values and adopted as the first apparatus dependent value in the four-dimensional conversion table. In the present embodiment, the apparatus dependent value having the shortest distance to the input value (second apparatus dependent value) is adopted as the first apparatus dependent value from among a plurality of color value candidates. For example, a distance between the input value $(b_i, K_i)$ and the apparatus dependent value $(b'_a, K'_a)$ is a distance $r_a$ illustrated in FIG. 10 and a distance between the input value $(b_i, K_i)$ and the apparatus dependent value $(b'_b, K'_b)$ is a distance $r_b$ illustrated in FIG. 10.

Contents described above are implemented by minimizing an object function represented by the following expression (11).

$$E_2 = |J_b' - J_b|^2 \quad (11)$$

$J_b$ and $J_b'$ are represented by expressions (12) and (13), respectively.

$$J_b = [c_b m_b y_b k_b r_b]^T \quad (12)$$

$$J_b' = [c_b' m_b' y_b' k_b' r_b']^T \quad (13)$$

From this, $c_b$ is a cyan value constituting the second apparatus dependent value which is an input value and $c_b'$ is a cyan value constituting the first apparatus dependent value capable of being an output value. Matters described are also applied similarly to m (magenta value), y (yellow value), and k (black value). $J_b$ corresponds to the second apparatus dependent value $(b_i, k_i)$ in FIG. 10.

$E_2$ may be calculated by targeting all K values for which a desired color value is within a reproduction range using the relationship described above and the minimum value of the $E_2$ may be searched, and when the gradient of $E_2$ becomes zero while minutely updating $J_b'$, it may be determined that $E_2$ becomes minimum. However, even when it is intended to obtain the minimum value of $E_2$, constraints are to be imposed so that the Labs is satisfied in the basic characteristics BL5.

According to the correction table generation method of the fourth embodiment, the first apparatus dependent value capable of reproducing the target color value having target characteristics (linearity) with respect to the second apparatus dependent value is obtained so that the input value (second apparatus dependent value) of the five-dimensional conversion table and the output value (first apparatus dependent value) become values as close as possible and thus, it is possible to reduce change in the apparatus dependent value accompanied by five-dimensional conversion. As a result, in a case where the correction table generated by the method described above is applied to a printer, it is possible to suppress excessive replacements of the apparatus dependent values. The method of the fourth embodiment is particularly preferable to a case where the color system of the printer is four or more dimensional color system.

E. Fifth Embodiment

In the fifth embodiment, description will be made on another example of the target color value determination step (Step S184) for four dimensions. It is possible to use the target color value determination step for four dimensions of the fifth embodiment instead of the target color value determination step (Step S184) for four dimensions of the first to third embodiments.

Figure 12:
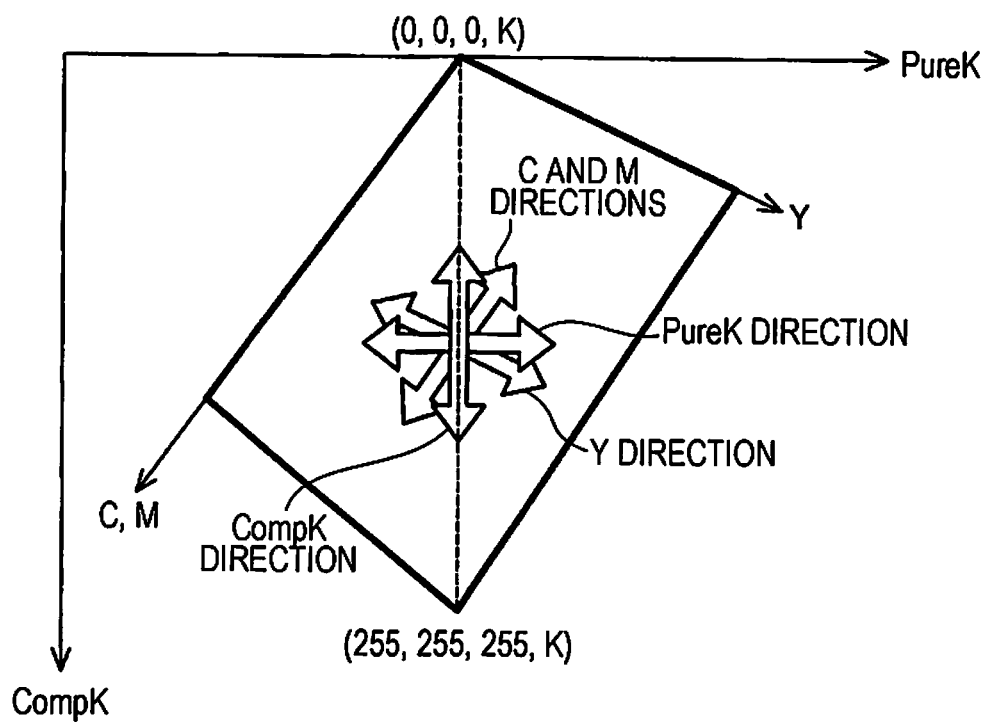
FIG. 12 is an explanatory diagram for explaining distribution of gray lattice points in color space of a CMYK color system.

FIG. 12 is an explanatory diagram for explaining distribution of gray lattice points in color space of a CMYK color system. In FIG. 12, C, and M directions are described by being collected together. A gray lattice point is a lattice point corresponding to gray among a plurality of input lattice points (for example, 83,521 input lattice points ($17^4$ input lattice points)) of the color conversion table 20. The gray lattice point is referred to as the "achromatic color input value" in the fifth embodiment.

As illustrated, the gray lattice points are distributed in a two-dimensional shape. For that reason, the Lab value is determined so that chromaticity (a value, b value) has linearity with respect to lightness (L value) in the gray lattice points to suppress occurrence of color torsion.

In the target color value determination step for four dimensions of the fifth embodiment, in a case where it is intended to determine the target color value for four dimensions corresponding to the input value which corresponds to gray among input values in the plurality of input lattice points (for example, 83,521 input lattice points ($17^4$ input lattice points)) of the color conversion table 20, lightness (L value) is determined so that the object function E is minimized, similar to the first and third embodiments, and chromaticity (a value, b value) is determined so as to have linearity with respect to determined lightness (L value). For the target color values for four dimensions corresponding to the input values in the remaining input lattice points, each of lightness (L value) and chromaticity (a value, b value) is determined so that the object function E is minimized, similar to the first and third embodiments.

According to the correction table generation method of the fifth embodiment, the target color value corresponding to the gray lattice point is neutralized (achromatization in which hue cannot be visually felt). Lightness (L value) is determined by the same method (minimization of object function E) as that for the input lattice point other than the gray lattice point and thus, it is possible to secure continuity of color values between the gray lattice point and a surrounding lattice point thereof, and obtain natural lightness characteristics.

F. Modification Example (1) As the object function E, parameters other than the second-order differential parameter may be taken into account. For example, a first-order differential parameter may be used.

(2) The colors constituting the apparatus dependent color system may be changed. For example, the CMY and the RGB may be available and the apparatus dependent color system may be configured by adding a specific color such as R (red) or G (green) to the CMY and the RGB or the CMYK. The ink colors of the printer is not limited to the CMYK and magenta (light cyan (Lc) or light magenta (Lm)) may be added to the CMYK and a specific color of red (R), orange (Or), green (Gr), blue (Bl), or the like may be added to the CMYK.

(3) In the correction table generation system, the colorimetric device may be configured by using an independent colorimetric device without building a colorimetry device in the printer.

(4) In FIG. 1, although an example in which the color conversion table 20 and the correction table 10 are separately applied is illustrated, a configuration in which the color conversion table is corrected using the color conversion table 20 and the correction table 10 and the corrected color conversion table is provided to a user (is applied to the printer) may be available. Specifically, the output value of the correction table 10 for the input lattice point of the correction table 10 may be converted into an ink amount by the color conversion table 20 to regard the table in which the second apparatus dependent value and the ink amount are correlated with each other as the corrected color conversion table.

(5) In the embodiments described above, although description was made on a program, a method, and an apparatus that generate a correction table, it can also be applied to a printer manufacturing system including a combining unit that combines the correction table obtained as described above into the printer. The correction table generation device 100 that generates the correction table may also be configured to be included in the printer manufacturing system or to be included in another system or apparatus. The combining unit of the manufacturing system can be implemented as, for example, an installer of a printer driver (install program).

(6) Although description was made on the program, the method, and the apparatus that generate the correction table, it can also be implemented by the printer which includes the correction table generation device described above and converts input print data based on the correction table generated by the correction table generation device to be printed. Furthermore, such a printer may be configured to include a colorimetric device. The printer including the colorimetric device may be configured to include a program and a processing unit that execute Steps S120 and S140 in the correction table generation processing (FIG. 3) in the embodiments described above.

(7) In the embodiments described above, an example in which the correction table generation method of the embodiments is executed by the correction table generation system 300 is described, but is not limited thereto. For example, a preparer of the correction table 10 may input test chart data to the printer including the color conversion table 20 from a computer other than the correction table generation device 100, cause the printer to print a test chart, acquire the first color value by the colorimetric device, and the preparer of the correction table 10 may input a colorimetry result (first color value) to the correction table generation device 100.

In the embodiments described above, some or all of functions and processing implemented by hardware may be implemented by software. A function and some or all of functions and processing implemented by software may be implemented by hardware. As hardware, various circuits, for example, an integrated circuit, a discrete circuit, a circuit module obtained by combining the circuits, and the like may be used.

The technology disclosed in the present specification is not limited to the embodiments, examples, or modification examples described above and can be embodied in various aspects in a range without departing from the gist thereof. For example, technical features of the embodiments, the examples, and the modification examples corresponding to technical features of respective aspects described in Summary section can be appropriately replaced or combined in order to solve some or all of the problems described above or achieve some or all of effects described above. When the technical features are not explained as essential ones, the technical features can be deleted.

This application claims priority under 35 U.S.C. § 119 to Japanese Patent Application No. 2016-234990, filed Dec. 2, 2016. The entire disclosure of Japanese Patent Application No. 2016-234990 is hereby incorporated herein by reference.

What is claimed is:

1. A correction table generation method of generating a correction table for correcting an input value of a predetermined color conversion table in order to determine an ink amount to be ejected by a printer, the method comprising:
   acquiring a first color value of an apparatus non-dependent color system corresponding to an input value of a multi-dimensional apparatus dependent color system in an input lattice point of the color conversion table by measuring a color value of a test chart that reflects an output characteristic of the printer, with the apparatus dependent color system corresponding to a color system of the printer; and
   generating a multi-dimensional conversion table in which a first apparatus dependent value of the apparatus dependent color system having color conversion table color value characteristics which are characteristics of the first color value with respect to the input value is correlated with a second apparatus dependent value of the apparatus dependent color system having approximate linearity with respect to a color value of the apparatus non-dependent color system over multiple dimensions,
wherein the generating of the multi-dimensional conversion table includes
determining a target color value for multiple dimensions having approximate linearity with respect to the input value over the multiple dimensions, so that an object function is minimized by defining a cubic spline function, in which a value of the apparatus dependent color system is set as an independent variable and a color value of the apparatus non-dependent color system is set as a dependent variable, for each one dimension of the multiple dimensions and generating the object function using the cubic spline function corresponding to all dimensions, and
determining the first apparatus dependent value corresponding to the second apparatus dependent value by interpolation using the input value, the target color value for the multiple dimensions, and the first color value.

2. The correction table generation method according to claim 1, further comprising:
generating a one-dimensional conversion table in which a third apparatus dependent value of the apparatus dependent color system having approximate linearity with respect to the color value of the apparatus non-dependent color system in one dimension is correlated with the first apparatus dependent value for all dimensions,
wherein the generating of the multi-dimensional conversion table
includes obtaining the second apparatus dependent value using inverse one-dimensional conversion of the one-dimensional conversion table, and
determines the target color value for the multiple dimensions by substituting the second apparatus dependent value obtained in the inverse one-dimensional conversion into the independent variable in the determining of the target color value for multiple dimensions.

3. The correction table generation method according to claim 1, further comprising:
generating a one-dimensional conversion table in which a third apparatus dependent value of the apparatus dependent color system having approximate linearity with respect to the color value of the apparatus non-dependent color system in one dimension is correlated with the first apparatus dependent value for all dimensions; and
correcting the first apparatus dependent value of the multi-dimensional conversion table by performing inverse one-dimensional conversion which is inverse conversion of the one-dimensional conversion table and multi-dimensional conversion using the multi-dimensional conversion table.

4. The correction table generation method according to claim 1,
wherein the object function is a total sum, in all of the multiple dimensions, of a square sum of a second-order differential parameter of the cubic spline function in each dimension.

5. The correction table generation method according to claim 1,
wherein the object function is a total sum of all combinations in all of the multiple dimensions, of a square sum of a difference between a first second-order differential parameter and a second second-order differential parameter, which are the second-order differential parameters of each of a first cubic spline function and a second cubic spline function which are the cubic spline functions in a first dimension and adjacent to each other in a direction of a second dimension different from the first dimension.

6. The correction table generation method according to claim 1,
wherein, in the determining of the first apparatus dependent value, the first apparatus dependent value is determined so that a difference between the second apparatus dependent value and the first apparatus dependent value becomes minimum.

7. The correction table generation method according to claim 1,
wherein, in the determining of the target color value for multiple dimensions,
in a case where it is intended to determine the target color value for multiple dimensions corresponding to an achromatic color input value that specifies an achromatic color among the plurality of input values, lightness is determined so that the object function becomes minimum and the corresponding chromaticity is determined to have linearity with respect to determined lightness to thereby determine the target color value for multiple dimensions, and
in a case where it is intended to determine the target color value for multiple dimensions corresponding to remaining input values, lightness and chromaticity constituting the target color value for multiple dimensions is determined so that the object function becomes minimum.

8. A non-transitory computer readable recording medium, having a program that causes a computer to execute generating a correction table for correcting an input value of a predetermined color conversion table in order to determine an ink amount to be ejected by a printer, the program causing the computer to execute process comprising:
acquiring a first color value of an apparatus non-dependent color system corresponding to an input value of a multi-dimensional apparatus dependent color system in an input lattice point of the color conversion table by measuring a color value of a test chart that reflects an output characteristic of the printer, with the apparatus dependent color system corresponding to a color system of the printer; and
generating a multi-dimensional conversion table in which a first apparatus dependent value of the apparatus dependent color system having color conversion table color value characteristics which are characteristics of the first color value with respect to the input value is correlated with a second apparatus dependent value of the apparatus dependent color system having approximate linearity with respect to a color value of the apparatus non-dependent color system over multiple dimensions,
wherein the generating of the multi-dimensional conversion table includes
determining a target color value for multiple dimensions having approximate linearity with respect to the input value over the multiple dimensions, so that an object function is minimized by defining a cubic spline function, in which a value of the apparatus dependent color system is set as an independent variable and a color value of the apparatus non-dependent color system is set as a dependent variable, for each one dimension of the multiple dimensions and generating the object function using the cubic spline function corresponding to all dimensions, and determining the first apparatus dependent value corresponding to the second apparatus dependent value by interpolation using the input value, the target color value for the multiple dimensions, and the first color value.

* * * * *